(No Model.)

W. P. HARRIS & W. R. D. ALLEN.
ALFALFA TRACK CLEANER.

No. 522,205. Patented July 3, 1894.

Witnesses
J. W. Reynolds
Chas. B. Ayer

Inventors
William P. Harris
Willie R. D. Allen
By John Wedderburn Attorney

THE NORRIS PETERS CO., PHOTO-LITHO., WASHINGTON, D. C.

UNITED STATES PATENT OFFICE.

WILLIAM P. HARRIS AND WILLIE R. D. ALLEN, OF VALE, OREGON.

ALFALFA TRACK CLEANER.

SPECIFICATION forming part of Letters Patent No. 522,205, dated July 3, 1894.

Application filed December 8, 1893. Serial No. 493,130. (No model.)

*To all whom it may concern:*

Be it known that we, WILLIAM P. HARRIS and WILLIE R. D. ALLEN, citizens of the United States, residing at Vale, in the county of Malheur and State of Oregon, have invented certain new and useful Improvements in Alfalfa Track Cleaners; and we do hereby declare the following to be a full, clear, and exact description of the invention, such as will enable others skilled in the art to which it appertains to make and use the same.

This invention relates to an alfalfa track cleaner, and has for its object, for cleaning or dividing alfalfa, so that any mowing machine can take the full cut, which is accomplished by means which are simple and effective in their construction and operation, strong and durable, easily and readily handled, and cheaply manufactured and applied.

With these and other objects in view the invention consists of the construction and arrangement of the several parts, which will be more fully hereinafter described and claimed.

Figure 1:
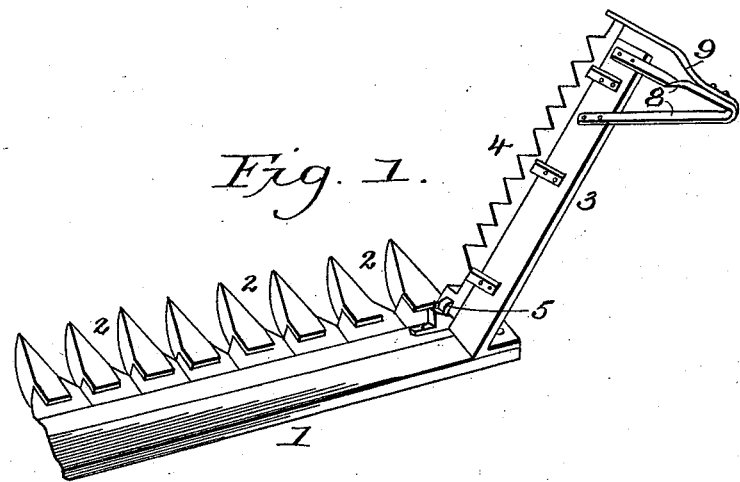
Figure 2:
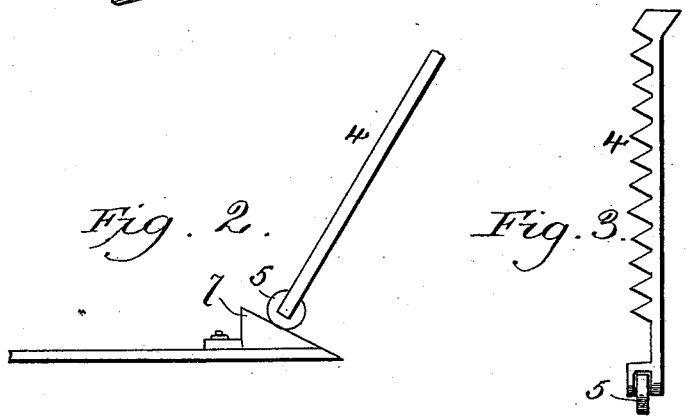
Figure 3:
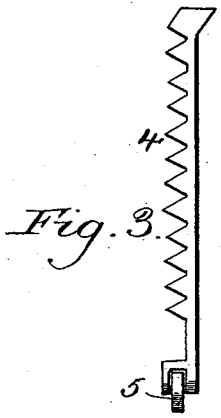

In the drawings: Figure 1 is a perspective view of a sickle bar of ordinary form, showing improved alfalfa cutter applied thereto. Fig. 2 is a rear edge elevation of the main sickle showing the wedge for raising the small sickle and other constructions incident to the invention. Fig. 3 is a detail perspective view of the small sickle, showing the manner of applying the pulley thereto.

Similar numerals of reference are employed to indicate corresponding parts in the several figures.

Referring to the drawings, the numeral 1 designates a main sickle bar, which is supplied with fingers or guards 2, and is in all respects similar to the ordinary mowing sickle now commonly employed in mowing machines. To the outer end of the said main sickle is secured an upright stationary sickle 3, arranged at an angle of inclination, and having co-acting therewith, a movable sickle 4, supplied with a pulley 5 at its lower end, which travels on a wedge block 7 at the outer end of the main sickle, and which is actuated through the operation of the said main sickle to produce an outstroke of the movable sickle 4. To the upper end of the stationary sickle 3 is secured a pair of bracket arms 8, to which the outer end of a spring 9 is attached, whose free end bears on the end of the movable sickle 4 and returns the said movable sickle inward. This operation, becoming continuous, produces a proper reciprocation of the said sickle.

By means of the construction and arrangement of parts herein set forth, a very effective operation can be attained. The upright sickles separate the cut from the standing alfalfa and enable the swath board to throw the said cut alfalfa out of the way.

It will be readily understood that many minor changes might be made in the construction and arrangement of the several parts, without in the least departing from the nature or spirit of the invention.

Having thus described the invention, what is claimed as new is—

In a device of the character set forth, the combination of a main reciprocating sickle having a wedge block on its outer end, another sickle arranged at an angle of inclination and having a reciprocating cutter bar with a roller journaled in the lower end thereof, said roller bearing on the upper surface of the wedge block, a pair of bracket arms connected to the outer end of the inclined sickle, and a spring having one end attached to said bracket arms and its opposite free end bearing on the upper end of the movable cutter bar of said inclined cutter, substantially as described.

In testimony whereof we have signed this specification in the presence of two subscribing witnesses.

WILLIAM P. HARRIS.
    WILLIE R. D. ALLEN.

Witnesses:
 TOM JONES,
 J. N. FELL.